United States Patent
Mikami et al.

(10) Patent No.: US 8,000,290 B2
(45) Date of Patent: Aug. 16, 2011

(54) WIRELESS LAN DEVICE HAVING TERMINAL FUNCTION, WIRELESS LAN DEVICE HAVING BASE STATION FUNCTION, AND WIRELESS NETWORK HAVING THE WIRELESS LAN DEVICE

(75) Inventors: Taro Mikami, Osaka (JP); Takayuki Matsui, Osaka (JP)

(73) Assignee: Panasonic Corporation, Osaka (JP)

( * ) Notice: Subject to any disclaimer, the term of this patent is extended or adjusted under 35 U.S.C. 154(b) by 767 days.

(21) Appl. No.: 11/597,181

(22) PCT Filed: May 23, 2005

(86) PCT No.: PCT/JP2005/009343
§ 371 (c)(1),
(2), (4) Date: Apr. 29, 2008

(87) PCT Pub. No.: WO2005/114914
PCT Pub. Date: Dec. 1, 2005

(65) Prior Publication Data
US 2008/0192709 A1    Aug. 14, 2008

(30) Foreign Application Priority Data
May 24, 2004   (JP) ................... 2004-153419

(51) Int. Cl.
*H04W 4/00*    (2009.01)
(52) U.S. Cl. .................. 370/329; 370/278; 370/445
(58) Field of Classification Search ............ 370/278, 370/329, 445
See application file for complete search history.

(56) References Cited

U.S. PATENT DOCUMENTS
6,434,132 B1    8/2002    Ishii et al.
(Continued)

FOREIGN PATENT DOCUMENTS
JP    10-229579    8/1998
(Continued)

OTHER PUBLICATIONS

Japanese Office Action, w/ English translation thereof, issued in Japanese Patent Application No. JP 2006-513749 dated Aug. 3, 2010.

(Continued)

*Primary Examiner* — Jason E Mattis
(74) *Attorney, Agent, or Firm* — McDermott Will & Emery LLP

(57) ABSTRACT

In a wireless network including a wireless LAN device having a base station function compatible with the IEEE 802.11e standard and a wireless LAN device having a terminal function compatible with the standard, a band-guaranteed data reception check timer 104' starts measuring a preset time when the terminal receives band-guaranteed data from the base station after a band acquisition response signal is transmitted from the base station to the terminal and a band-guaranteed data transfer is established between the base station and the terminal. If band-guaranteed data is not received from the base station before the measurement of the preset time is completed, the terminal determines that the wireless network connection has been disconnected to request the base station for re-connection of the wireless network after passage of the preset time. Therefore, even if the power supply to the base station is cut off to disconnect the wireless network connection between the wireless LAN devices, it is possible to immediately detect the disconnection of the wireless network connection and to re-connect the wireless network.

3 Claims, 17 Drawing Sheets

U.S. PATENT DOCUMENTS

| | | |
|---|---|---|
| 6,611,859 B1 | 8/2003 | Kohno |
| 2004/0179512 A1* | 9/2004 | Leblanc et al. ............... 370/352 |
| 2004/0184475 A1* | 9/2004 | Meier ........................... 370/449 |

FOREIGN PATENT DOCUMENTS

| | | |
|---|---|---|
| JP | 2000-261482 A | 9/2000 |
| JP | 2001-275168 | 10/2001 |
| JP | 2003-115794 A | 4/2003 |
| JP | 2003-143157 | 5/2003 |
| WO | WO 02/054328 A1 | 7/2002 |

OTHER PUBLICATIONS

S. Komorita et al., "Multihop Network between Base Stations for Autonomous Micro Mobility Support," IPSJ SIG, Technical Reports, 2004-MBL-29, Information Processing Society of Japan, May 14, 2004, vol. 2004, No. 44, pp. 147-152.

* cited by examiner

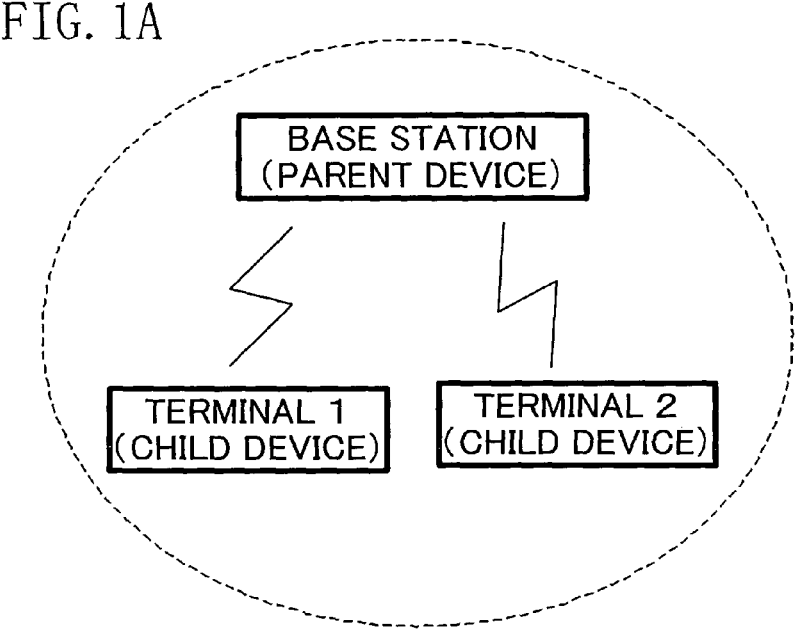

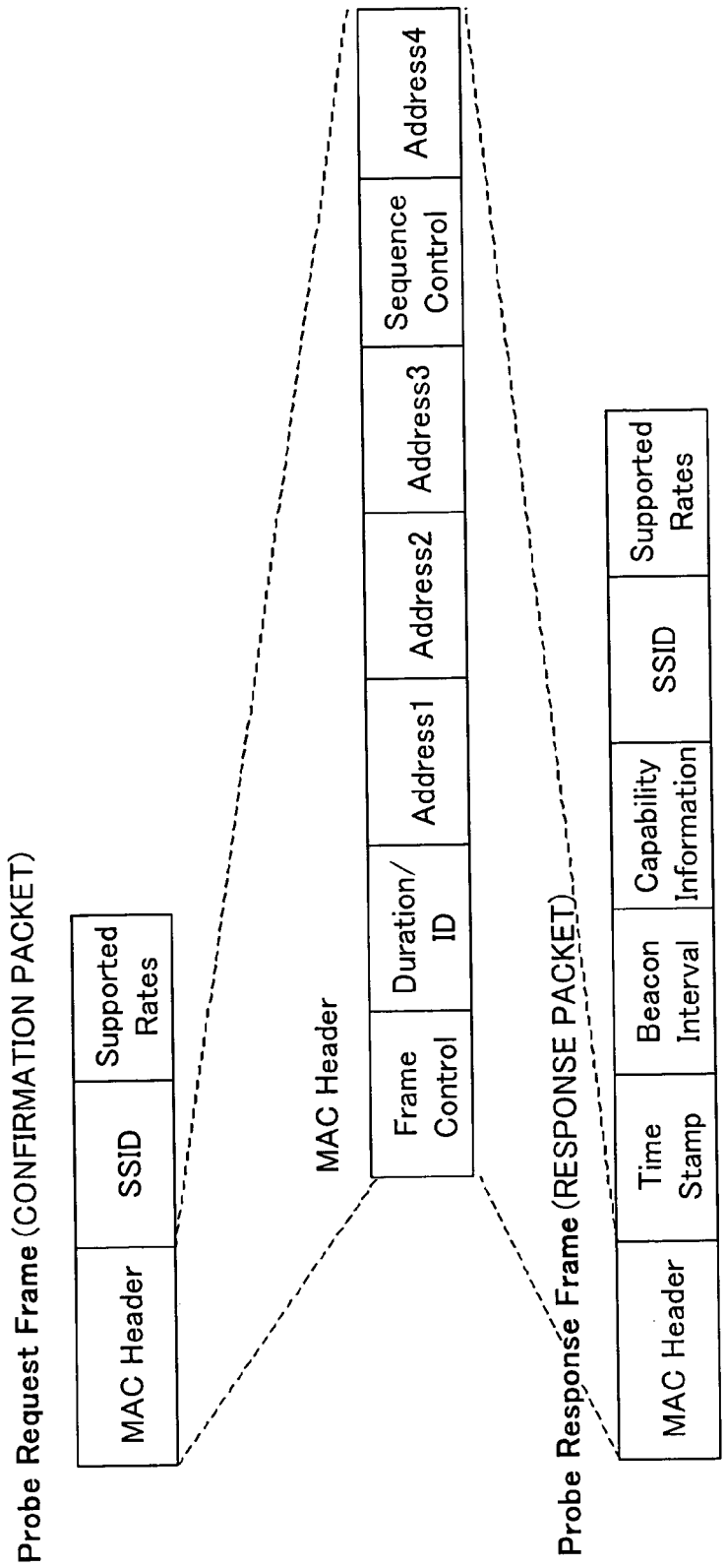

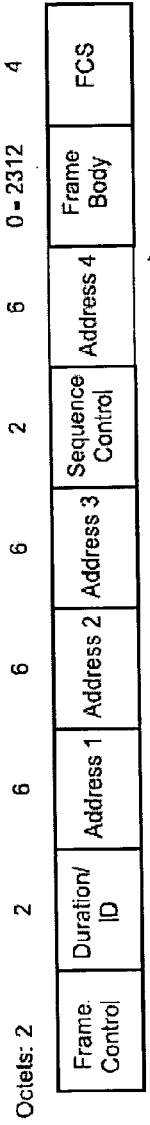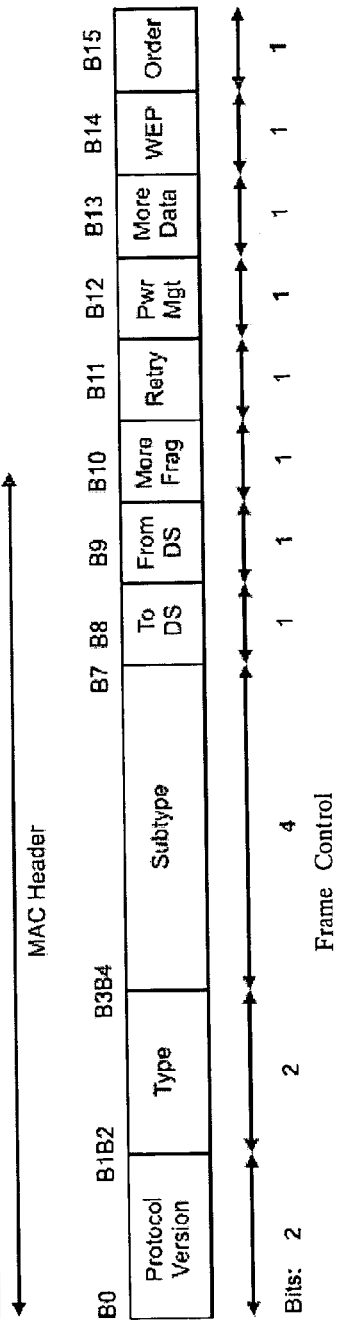
FIG. 4A
FIG. 4B
FIG. 4C

QoS CF-Poll Frame (TRANSMISSION RIGHT AWARDING )

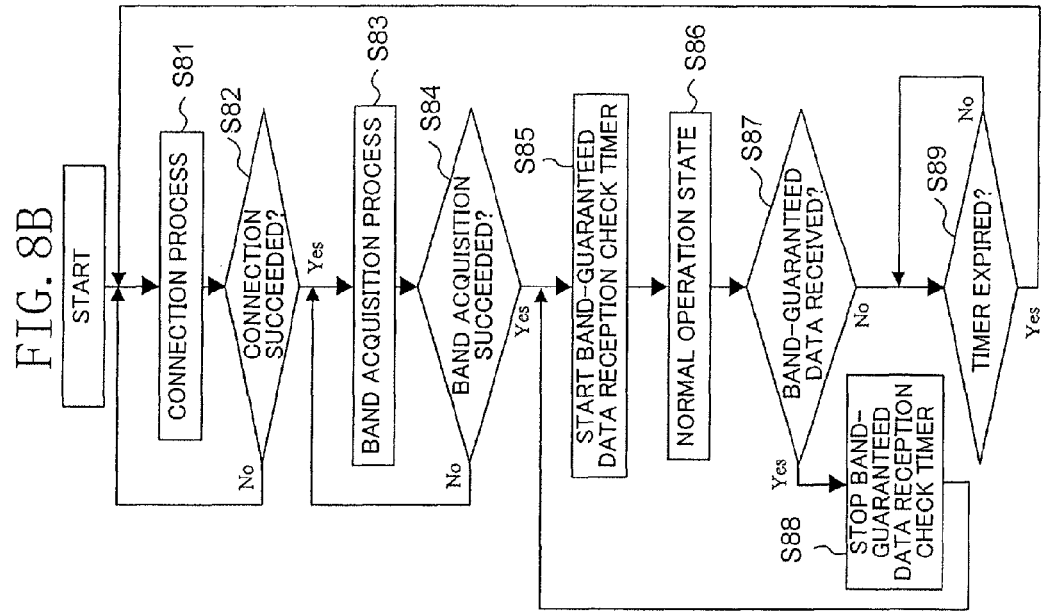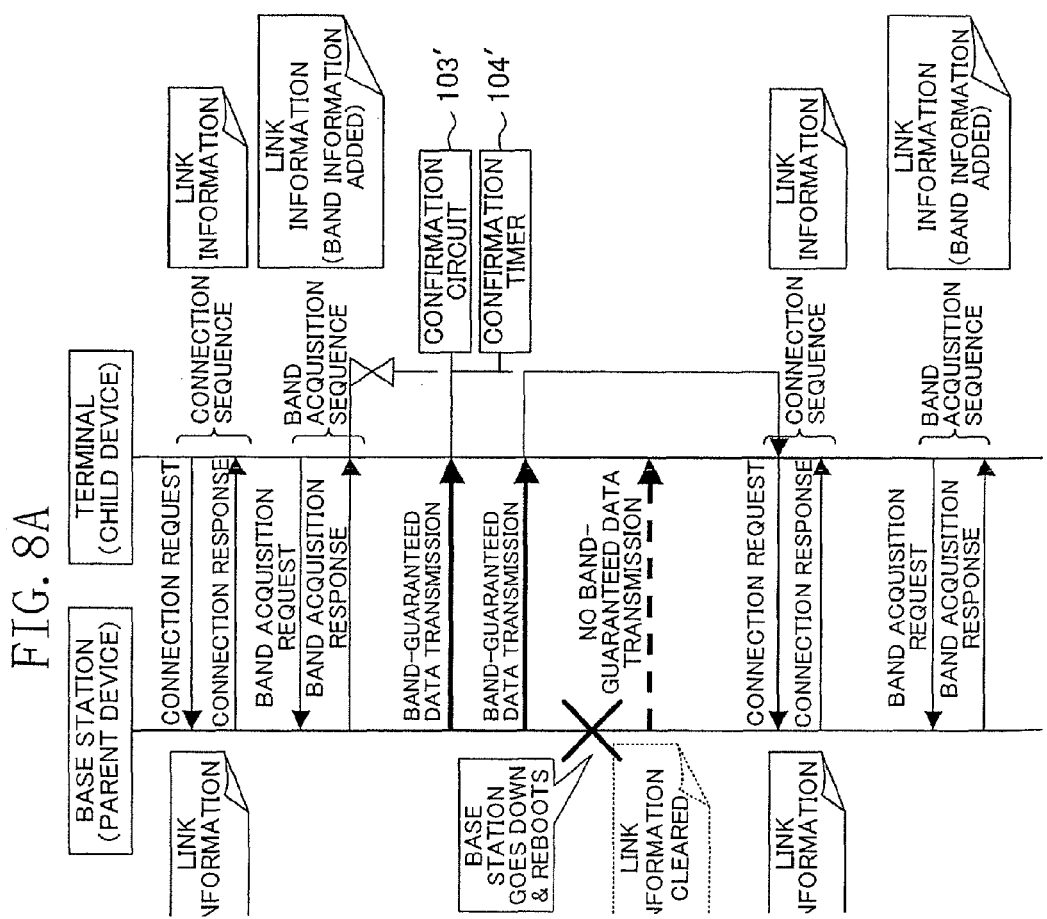

QoS Data Frame (BAND-GUARANTEED DATA)

FIG. 11

AddTs Request Frame (BAND ACQUISITION REQUEST)

| MAC Header | Category | Action | DialogToken | TSPEC |
|---|---|---|---|---|

| TS Info | Nominal MsduSize | Max MsduSize | Minimum Service Interval | Max Service Interval | Inactivity Interval | Suspension Interval | Service StartTime | Minimum DataRate | Mean Data Rate | Peak Data Rate | Max Burst Size | Delay Bound | Minimum Tx Rate |
|---|---|---|---|---|---|---|---|---|---|---|---|---|---|

| Traffic Type | tsid | direction | Access Policy | aggregation | apsd | priority | ackPolicy | schedule |
|---|---|---|---|---|---|---|---|---|

AddTs Response Frame (BAND ACQUISITION RESPONSE)

| MAC Header | Category | Action | DialogToken | StatusCode | TsDelay | TSPEC |
|---|---|---|---|---|---|---|

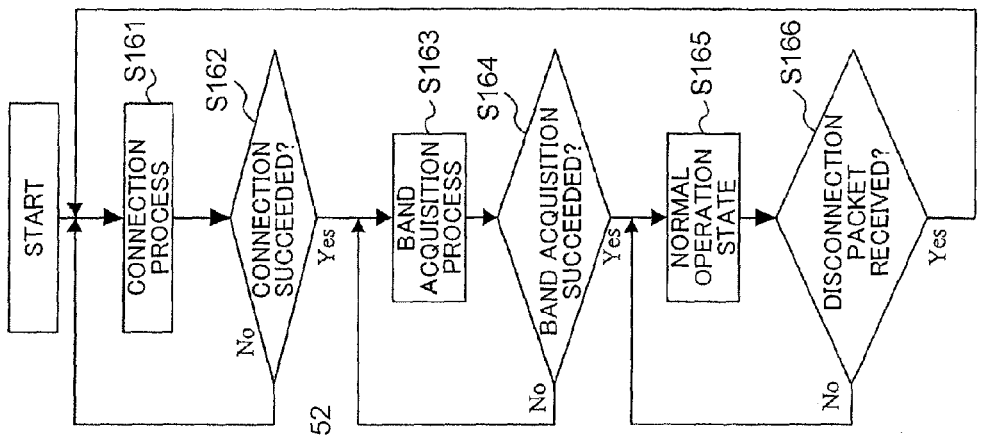
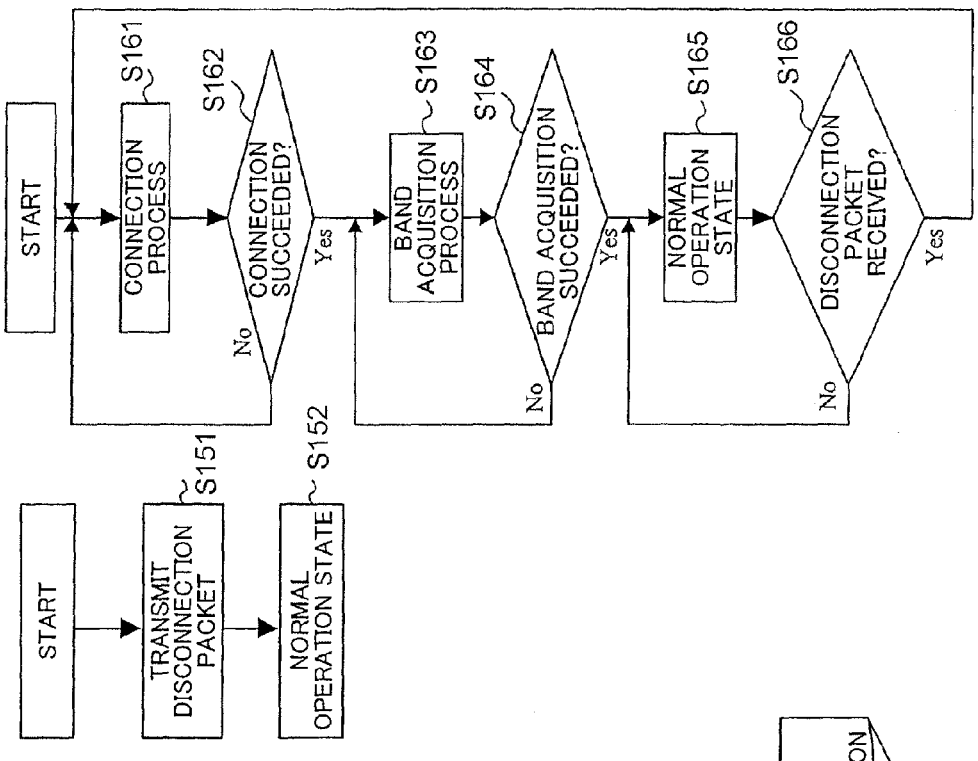
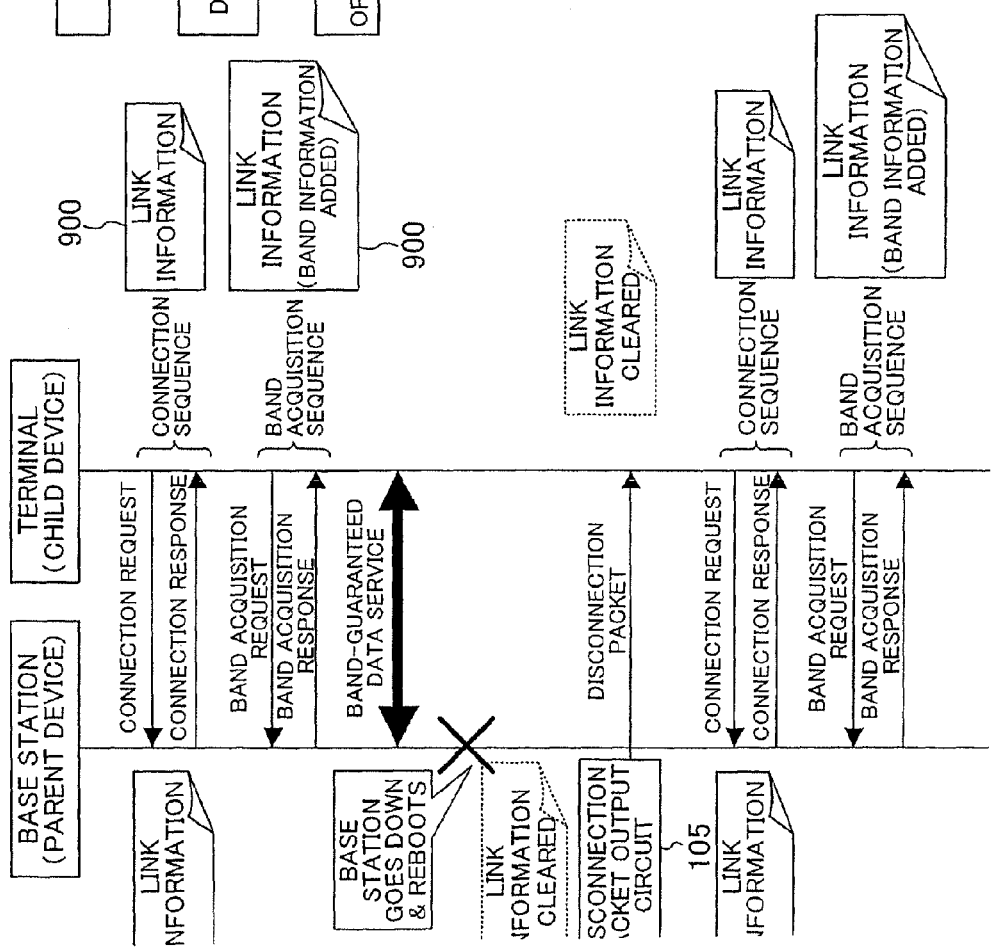

Deauthentication (DISCONNECTION PACKET)

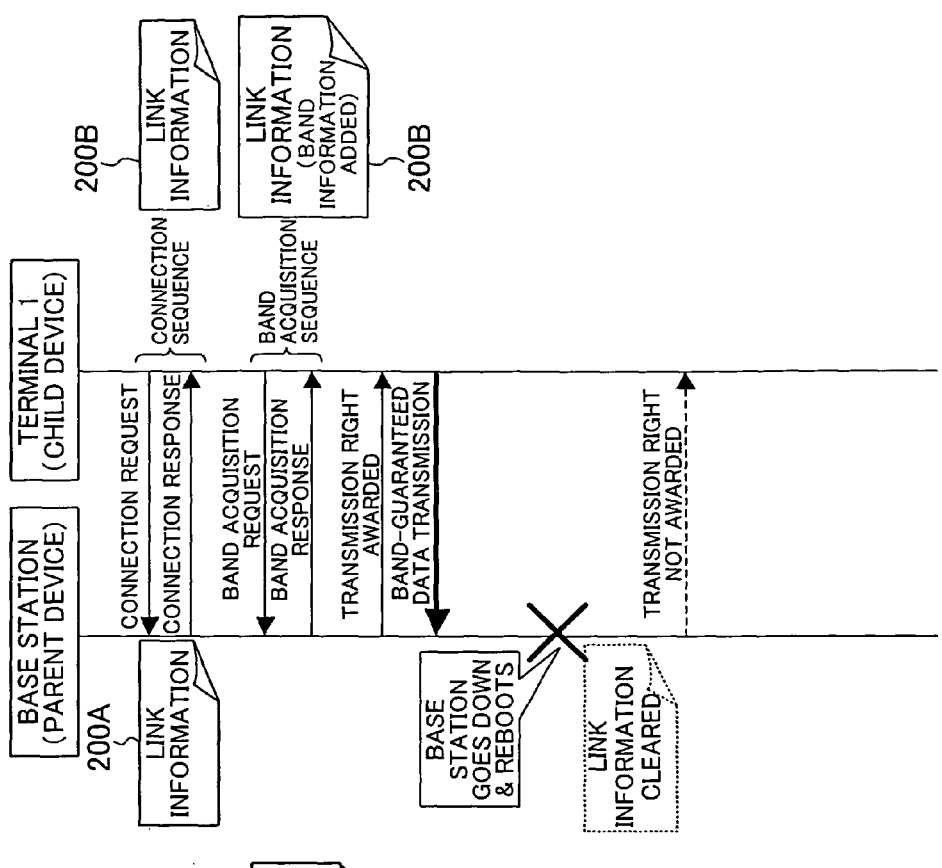
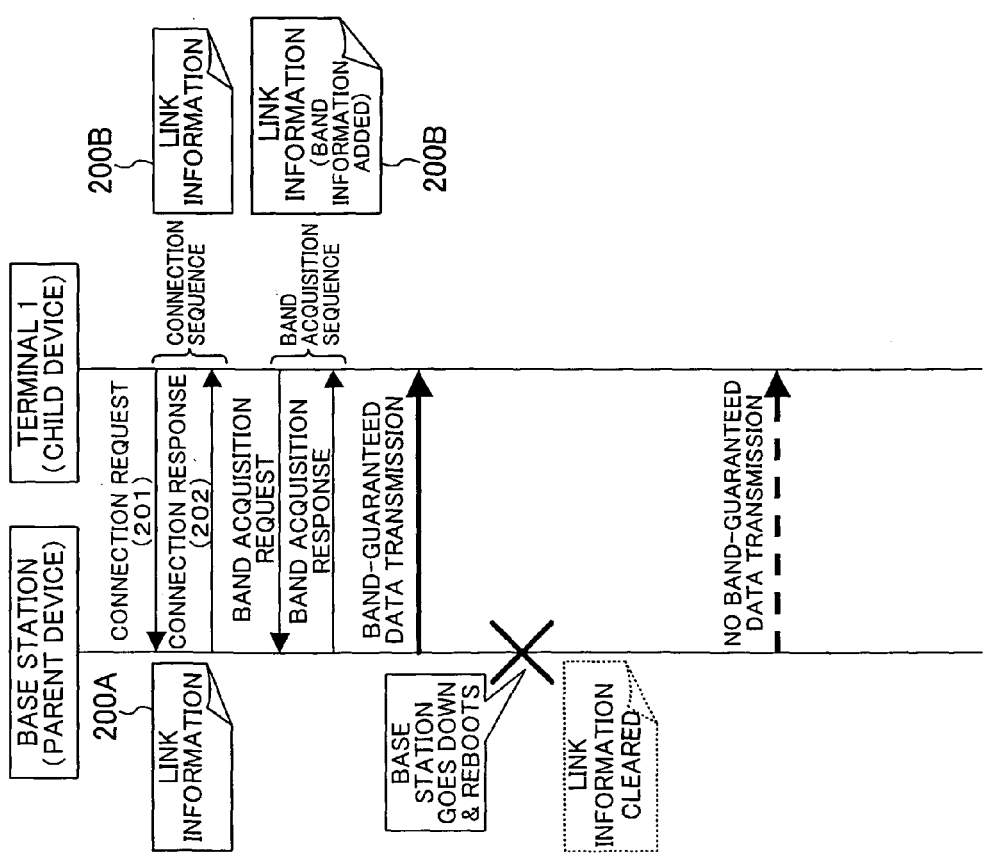

WIRELESS LAN DEVICE HAVING TERMINAL FUNCTION, WIRELESS LAN DEVICE HAVING BASE STATION FUNCTION, AND WIRELESS NETWORK HAVING THE WIRELESS LAN DEVICE

RELATED APPLICATIONS

This application is the U.S. National Phase under 35 U.S.C. §371 of International Application No. PCT/JP2005/009343 filed on May 23, 2005, which in turn claims the benefit of Japanese Patent Application No. 2004-153419 filed on May 24, 2004.

TECHNICAL FIELD

The present invention relates to a wireless LAN device having a wireless function using a band control technique to be used for streaming, etc., and to a wireless network.

BACKGROUND ART

In recent years, the IEEE 802.11 wireless LAN system has been used as a wireless packet communications system for which standardization, etc., have been done as a system realizing a high-speed wireless data transfer. In this wireless LAN system, one wireless link is established between one device (parent device) and at least one terminal (child device), and wireless stations of one wireless link share a single wireless channel by CSMA/CA (Carrier Sense Multiple Access with Collision Avoidance).

IEEE 802.11e, being an extension of the IEEE 802.11 wireless LAN system, additionally provides a link connection for which a band for data transfer is guaranteed, in addition to the wireless link connection of the conventional IEEE 802.11, whereby channels necessary for real time communications can be reserved with priority.

With regard to the conventional band control technique, for example, Patent Document 1 describes controlling a re-establishment process using a failure detecting function and a timer for a re-establishment process in a case where the base station undergoes an inadvertent network failure, such as power resetting, after completion of a negotiation for a band control between the base station and a terminal.

Patent Document 1: Japanese Laid-Open Patent Publication No. 2001-275168

DISCLOSURE OF THE INVENTION

Problems to be Solved by the Invention

However, with regard to the above technique, Patent Document 1 fails to describe a specific failure detecting method.

An example where a network failure occurs after completion of a negotiation for a band control between the base station (parent device) and a terminal (child device) will now be described with reference to the drawings.

FIG. 1(*a*) is a conceptual diagram showing a wireless network being formed by a base station and terminals 1 and 2. In FIG. 1(*a*), it is assumed that the terminal 1 is compatible with the IEEE 802.11e standard while the terminal 2 is not. FIGS. 1(*b*), 1(*c*) and 1(*d*) show link information of the base station, the terminal 1 and the terminal 2, respectively.

FIG. 17(*a*) shows a communications sequence between the base station and the terminal 1 in a case where the terminal is the receiver side. FIG. 17(*a*), being chronological in the downward direction, shows a case where the base station and the terminal 1 establishes a network connection, after which the base station undergoes temporary power down for some reason, and the link information on the base station side is cleared.

First, the terminal 1 boots and transmits a connection request 201 to the base station, and the connection is established upon receiving a connection response 202 from the base station. On the base station side, link information 200A is created for the addition of the terminal 1. On the side of the terminal 1, link information 200B is created for the successful connection.

Then, the terminal 1 transmits a band acquisition request signal, in response to which the base station transmits a band acquisition response to the terminal 1, whereby the terminal acquires the band guarantee. Then, band information is added to the link information 200B of the terminal. Then, the data communications process starts.

However, if the base station undergoes temporary power down for some reason, the link information 200A on the base station side is cleared, and the communications process may not resume normally after reboot.

After the terminal 1 compatible with the IEEE 802.11e standard acquires a band guarantee for data transfer, the terminal 1 cannot transmit data unless it is permitted by the base station due to the presence of the band guarantee, and will be no longer able to normally communicate with the base station of which the link information 200A is cleared.

Next, FIG. 17(*b*) shows a communications sequence between the base station and the terminal 1 in a case where the terminal 1 is the transmitter side and there is a band guarantee. In FIG. 17(*b*), first, the terminal 1 boots and establishes a connection with the base station through a connection sequence, and then the terminal 1 performs a band acquisition sequence to acquire a band, in a manner similar to that shown in FIG. 17(*a*). As each sequence is performed, link information is written as described above. In the case of FIG. 17(*b*), the terminal 1 is the transmitter side, and the data communications process starts as the terminal 1 is awarded the transmission right from the base station.

However, if the base station undergoes temporary power down for some reason, the link information 200A on the base station side is cleared, and the terminal may not be awarded the transmission right and the communications process may not resume normally after reboot, as in the case of FIG. 17(*a*).

Specifically, as in the case of FIG. 17(*a*), the terminal 1 cannot transmit data unless it is permitted by the base station due to the presence of the band guarantee, and will be no longer able to normally communicate with the base station of which the link information 200A is cleared.

An object of the present invention is to make it possible for a terminal to make a determination as to a situation where the base station undergoes temporary power down and the link information on the base station side is cleared in a wireless network connection with a band guarantee, i.e., whether or not there has been a failure in a wireless network connection with a band guarantee.

In addition to the above object, a further object of the present invention is to realize the following operation. If a terminal determines that there has been a failure in a wireless network connection, an attempt is made, after the base station reboots, to re-establish a wireless network connection between the base station and the terminal, which was performing a band-guaranteed data transfer with the base station.

Means for Solving the Problems

In order to achieve the objects set forth above, the present invention has been made utilizing the following fact. If the base station undergoes power down after a band is guaranteed, the link information on the base station side is cleared. Therefore, band-guaranteed data transfer cannot therefore be done, but signals for which a band is not guaranteed (i.e., signals that are not restricted by the band guarantee) can be exchanged between the terminal and the base station. Based on this fact, it is made possible for the terminal to determine whether or not there has been a failure in a band-guaranteed wireless network connection by transmitting a confirmation signal from the terminal to the base station and receiving a response signal from the base station, or by checking whether or not a signal from the base station used for band guarantee has been received.

Moreover, in the present invention, it is made possible for the terminal to determine whether or not there has been a failure in a band-guaranteed wireless network connection by employing a configuration where the base station makes all the terminals forcibly clear the link information.

Furthermore, in the present invention, if the terminal determines that there has been a failure in a band-guaranteed wireless network connection, it is determined that the base station has undergone power down, and the terminal is made to transmit a re-connection request signal to the base station.

Specifically, a wireless LAN device having a terminal function of the present invention is a wireless LAN device having a terminal function, for constructing a wireless network with one wireless LAN device having a base station function compatible with an IEEE 802.11e standard being a generic standard to an IEEE 802.11 standard and having a data transfer band guarantee function and at least one wireless LAN device having a terminal function compatible with the IEEE 802.11e standard, the wireless LAN device having a terminal function including: a signal output circuit for, after a band is guaranteed for data transfer between the wireless LAN device having a terminal function and the wireless LAN device having a base station function, outputting a base station confirmation signal to the wireless LAN device having a base station function by using a signal of the IEEE 802.11 standard or a signal of the IEEE 802.11e standard for which there is no band guarantee; and a confirmation circuit for, when the wireless LAN device having a base station function transmits a confirmation response signal in response to the base station confirmation signal output from the signal output circuit, receiving the confirmation response signal to confirm that the wireless LAN device having a terminal function is connected to the wireless LAN device having a base station function.

In the present invention, the signal output circuit includes a confirmation timer that starts measuring a preset time when the confirmation circuit receives the confirmation response signal, and the base station confirmation signal is again repeatedly output to the wireless LAN device having a base station function when the preset time expires.

In the present invention, the base station confirmation signal output by the signal output circuit is a confirmation packet being a signal of the IEEE 802.11 standard.

In the present invention, the signal output circuit includes a confirmation timer that starts measuring a preset time when a band acquisition response signal being a signal of the IEEE 802.11e standard is received from the wireless LAN device having a base station function and a band for data transfer is guaranteed, and a band acquisition request signal being a signal of the IEEE 802.11e standard is output to the wireless LAN device having a base station function as the base station confirmation signal after the preset time expires.

In the present invention, the signal output circuit includes a confirmation timer that starts measuring a preset time when a band acquisition response signal being a signal of the IEEE 802.11e standard is received from the wireless LAN device having a base station function and a band for data transfer is guaranteed, and a dummy band acquisition request signal being a signal of the IEEE 802.11e standard for which a data transfer bandwidth is narrow is output to the wireless LAN device having a base station function as the base station confirmation signal after the preset time expires.

In the present invention, the signal output circuit outputs a connection request signal being a signal of the IEEE 802.11 standard to the wireless LAN device having a base station function when the band acquisition response signal is not received from the wireless LAN device having a base station function as the confirmation response signal.

A wireless LAN device having a terminal function of the present invention is a wireless LAN device having a terminal function, for constructing a wireless network with one wireless LAN device having a base station function compatible with an IEEE 802.11e standard being a generic standard to an IEEE 802.11 standard and having a data transfer band guarantee function and at least one wireless LAN device having a terminal function compatible with the IEEE 802.11e standard, the wireless LAN device having a terminal function including: a confirmation circuit for, when a predetermined signal is received from the wireless LAN device having a base station function after a band is guaranteed for data transfer between the wireless LAN device having a terminal function and the wireless LAN device having a base station function, confirming that the wireless LAN device having a terminal function is connected to the wireless LAN device having a base station function.

In the present invention, the confirmation circuit includes a confirmation timer that starts measuring a preset time when the predetermined signal is received from the wireless LAN device having a base station function, and repeatedly starts the measurement of the preset time upon receiving the predetermined signal from the wireless LAN device having a base station function before the preset time expires.

In the present invention, the confirmation circuit outputs a connection request signal being a signal of the IEEE 802.11 standard to the wireless LAN device having a base station function when the measurement of the preset time by the confirmation timer is completed.

In the present invention, the predetermined signal received from the wireless LAN device having a base station function is a transmission right awarding signal being a signal of the IEEE 802.11e standard for which there is no band guarantee.

In the present invention, the predetermined signal received from the wireless LAN device having a base station function is band-guaranteed data being a signal of the IEEE 802.11e standard for which there is band guarantee.

A wireless LAN device having a base station function of the present invention is a wireless LAN device having a base station function, for constructing a wireless network with own wireless LAN device having a base station function compatible with an IEEE 802.11e standard being a generic standard to an IEEE 802.11 standard and having a data transfer band guarantee function and at least one wireless LAN device having a terminal function compatible with the IEEE 802.11e standard, the wireless LAN device base station function including: a disconnection request signal output circuit for, upon boot, outputting a disconnection request signal to all other wireless LAN devices having a terminal function with which the wireless network is constructed along with the wireless LAN device having a base station function.

A wireless network of the present invention includes the wireless LAN device having a terminal function of the present invention as described above, and a wireless LAN device having a base station function.

A wireless network of the present invention includes a wireless LAN device having a terminal function, and the wireless LAN device having a base station function of the present invention as described above.

Thus, even if the link information on the base station side is cleared due to power down of the base station, or the like, the terminal can transmit a base station confirmation signal to the base station by using a signal that can be transmitted to the base station, i.e., a signal of the IEEE 802.11 standard or a signal of the IEEE 802.11e standard for which there is no band guarantee. If the base station returns a confirmation response signal to the terminal, the terminal can determine that the wireless network connection with the base station is good and alive. If a confirmation response signal is not returned from the base station, the terminal can determine that the wireless network connection with the base station has been disconnected.

Particularly, in the present invention, when the terminal determines that the wireless network connection with the base station has been disconnected, the terminal outputs a connection request signal being a signal of the IEEE 802.11 standard to the base station, thereby allowing for re-connection of the wireless network with the base station.

In the present invention, after a band-guaranteed wireless network connection is established between the terminal and the base station, if the terminal receives a predetermined signal from the base station, e.g., a transmission right awarding signal or band-guaranteed data (data transferred in a guaranteed band), it is determined based on this reception of the predetermined signal that the wireless network connection with the base station is good. If the predetermined signal is not received from the base station, it is determined that the wireless network connection with the base station has been disconnected.

Particularly, in the present invention, when the terminal determines that the wireless network connection with the base station has been disconnected, the terminal outputs a connection request signal being a signal of the IEEE 802.11 standard to the base station, thereby allowing for re-connection of the wireless network with the base station.

In the present invention, when the base station boots, the base station always outputs a disconnection request signal to all the terminals forming the wireless network. Therefore, even if the link information is cleared due to power down of the base station, or the like, the terminals receiving the disconnection request signal clear the link information thereon. The terminal whose link information is cleared requests the base station for re-connection of the wireless network immediately in response to the link information being cleared.

Effects of the Invention

As described above, with the wireless LAN device having a terminal function of the present invention, even if the wireless network connection with the terminal is disconnected due to power down of the base station, or the like, the terminal can accurately determine the disconnection of the wireless network connection.

Particularly, in the present invention, when the terminal determines that the wireless network connection with the base station has been disconnected, the terminal outputs a connection request signal being a signal of the IEEE 802.11 standard to the base station, thereby allowing for re-connection of the wireless network with the base station.

With the wireless LAN device having a base station function of the present invention, when the base station boots, the base station always outputs a disconnection request signal to all the terminals forming the wireless network. Therefore, even if the link information is cleared due to power down of the base station, or the like, the terminals receiving the disconnection request signal can request the base station for re-connection of the wireless network.

BRIEF DESCRIPTION OF THE DRAWINGS

FIG. 1($a$) is a conceptual diagram showing a wireless network including a base station and two terminals 1 and 2, FIG. 1($b$) is a link information table of the base station, FIG. 1($c$) is a link information table of the terminal 1, and FIG. 1($d$) shows a link information table of the terminal 2.

FIG. 3 shows a format of the confirmation packet (Probe Request) of the IEEE 802.11 standard.

FIG. 4($a$) shows a frame format of IEEE 802.11 MAC, FIG. 4($b$) shows a frame control format of IEEE 802.11 MAC, and FIG. 4($c$) shows types of frames of IEEE 802.11 MAC.

FIG. 8($a$) shows a sequence of base station confirmation using a band-guaranteed data reception check timer according to a third embodiment of the present invention, and FIG. 8($b$) shows a flow of a base station confirmation using a band-guaranteed data reception check timer.

FIG. 11 shows a format of a band acquisition request signal (AddTs Request) and a band acquisition response signal (AddTs Response).

FIG. 15($a$) shows a sequence according to a sixth embodiment of the present invention where the base station uses a disconnection packet, FIG. 15($b$) shows a flow of the base station where the base station uses a base station disconnection packet, and FIG. 15($c$) shows a flow of a terminal where the base station uses a base station disconnection packet.

FIG. 17(a) shows a conventional sequence where the terminal is the receiver side, and FIG. 17(b) shows a conventional sequence where the terminal is the transmitter side and there is a band guarantee.

DESCRIPTION OF REFERENCE NUMERALS

Figure 2B:
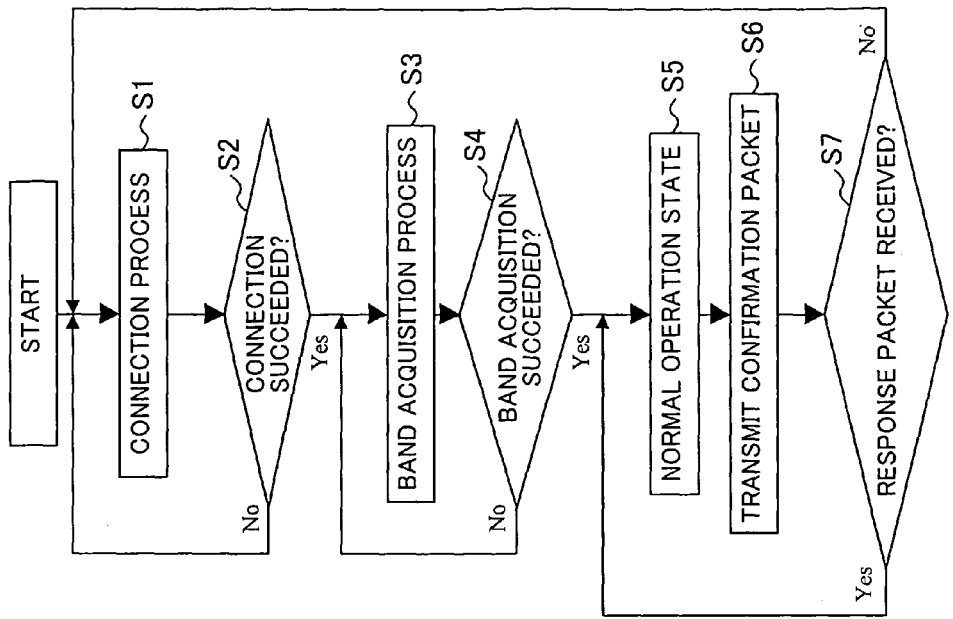
FIG. 2($a$) shows a base station confirmation sequence using confirmation packets according to a first embodiment of the present invention, and FIG. 2($b$) shows a base station confirmation flow using confirmation packets.

100 Signal output circuit
101, 103 Confirmation circuit
102 Confirmation timer
102' Band acquisition timer (confirmation timer)
102" Dummy band acquisition timer (confirmation timer)
104 Transmission right reception check timer (confirmation timer)
104' Band-guaranteed data reception check timer (confirmation timer)
105 Disconnection packet output circuit (disconnection request signal output circuit)
201, 301 Connection request
202, 302 Connection response
200A, 200B, 900 Link information
310 Confirmation packet
320 Response packet
410 Transmission right awarding signal (predetermined signal)

BEST MODE FOR CARRYING OUT THE INVENTION

Embodiments of the present invention will now be described with reference to the drawings.

First Embodiment

First, a first embodiment of the present invention will be described with reference to FIGS. 1 to 5.

FIG. 1(a) shows a wireless network including a wireless LAN device having a base station (parent device) function compatible with the IEEE 802.11e standard, a wireless LAN device 1 having a terminal (child device) function similarly compatible with the IEEE 802.11e standard, and a wireless LAN device 2 having a terminal (child device) function not compatible with the IEEE 802.11e standard but is compatible only with the IEEE 802.11 standard. FIGS. 1(b), 1(c) and 1(d) show link information of the base station, the terminal 1 and the terminal 2, respectively.

Figure 2A:
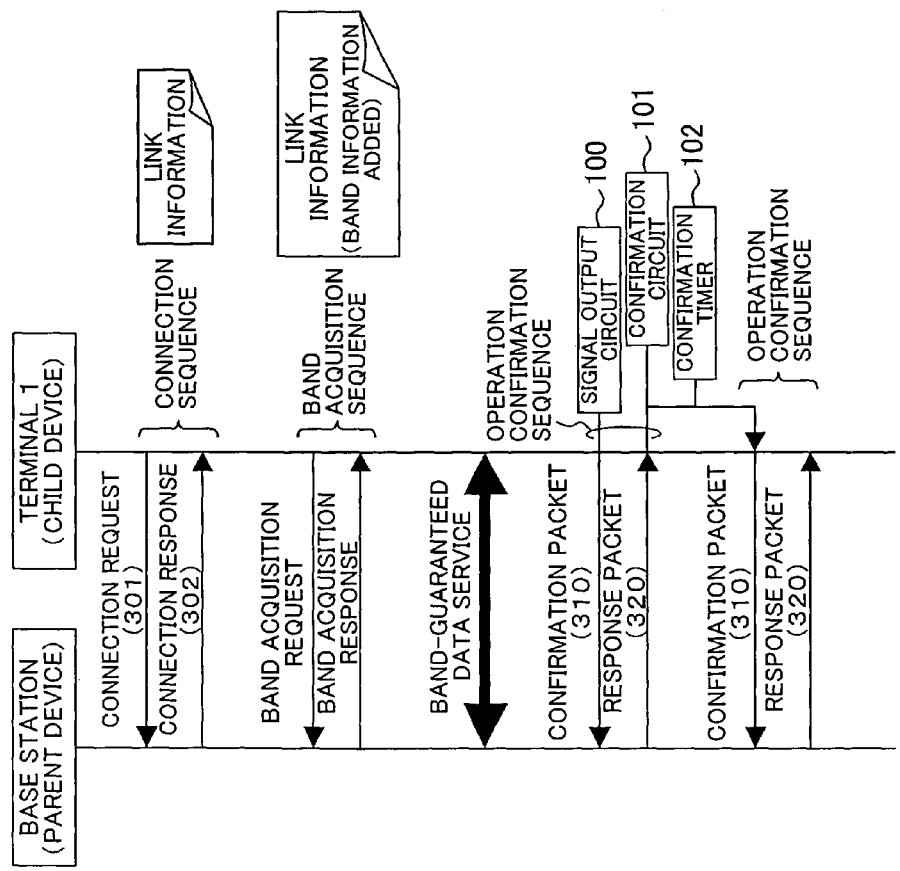

FIG. 2(a) shows a communications sequence between the base station and the terminal 1.

First, after boot, a wireless link is established through a connection sequence of receiving a connection response 302 from the base station in response to a connection request 301 from the terminal 1 to the base station, as shown in FIG. 2(a). Then, the terminal 1 records, as the link information, information indicating the establishment of the wireless network connection.

Then, the terminal 1 transmits a band acquisition request signal to the base station in order to acquire a band guarantee, and receives a band acquisition response signal from the base station in response to the request signal, thus acquiring a band guarantee. The information indicating the acquisition of the band guarantee through the band acquisition sequence is added to the link information of the terminal 1 as described above. Thus, a data service starts.

After the start of the data service; the terminal 1 transmits, from a signal output circuit 100 in the terminal 1 to the base station, a confirmation packet (base station confirmation signal) 310, which is not a signal unique to the IEEE 802.11e standard but is a signal used commonly by IEEE 802.11 standards. If a response packet (confirmation response signal) 320, used commonly by IEEE 802.11 standards as is the confirmation packet, is returned from the base station receiving the confirmation packet, a confirmation circuit 101 in the terminal 1 determines that the connection with the base station is alive. The time interval between the confirmation operations is determined based on a preset time that is measured by a probe confirmation timer (confirmation timer) 102 of the signal output circuit 100. The probe confirmation timer 102 starts measuring the preset time when the response packet 320 is transmitted to the terminal 1 from the base station and, when the measurement of the preset time is completed, the terminal 1 transmits again the confirmation packet 310 to the base station for base station confirmation.

FIG. 2(b) shows a flow of the terminal 1 corresponding to FIG. 2(a).

After boot, the terminal 1 attempts to connect to the base station in step S1. This corresponds to the operation of transmitting the connection request 301 in the connection sequence of FIG. 2(a). Whether the connection response 302 has been returned from the base station is checked in step S2. If there is no response and the connection fails, the connection process of step S1 is performed again. If there is a response, and the connection succeeds, the process proceeds to step S3.

In step S3, the terminal 1 transmits the base station a band acquisition request signal for acquiring a band guarantee and, in step S4, determines whether or not a band acquisition response being a response to the request signal has been returned from the base station. The operation of steps S3 to S4 is repeated until the band acquisition succeeds. The series of steps corresponds to the band acquisition sequence in FIG. 2(a).

Then, in step S4, if it is determined that the band acquisition has succeeded, the process proceeds to the normal operation state in step S5. After entering the normal state, the terminal 1 transmits a confirmation packet to the base station in step S6 in order to confirm that the connection with the base station has been kept alive. In response to this, if a response packet is returned from the base station, it is determined in step S7 that the connection has been kept alive, and the process returns to the normal operation state in step S5. If no response packet is returned, it is determined that the connection has been disconnected, and the process returns to step S1 to again perform the connection process. The series of steps S5 to S7 corresponds to the operation confirmation sequence of FIG. 2(a).

FIG. 3 shows a format of the confirmation packet and the response packet (Probe Request). The format of the packet shown herein is the format used by communications devices of the IEEE 802.11e standard being a generic standard to the IEEE 802.11.

FIG. 4(a) shows the frame format of IEEE 802.11 MAC, and FIG. 4(b) shows, on an enlarged scale, the Frame Control portion, being the first two octets, of the frame format of IEEE 802.11 MAC shown in FIG. 4(a). FIG. 4(c) shows types of frames of IEEE 802.11 MAC.

Each frame type of IEEE 802.11 MAC shown in FIG. 4(c) can be identified by the type field value and the subtype field value included in the MAC header.

For example, if the type value is 00 and the subtype value is 0100, it is a confirmation packet. The terminal 1 transmits the confirmation packet to the base station, and can confirm that the base station exists on the same channel when the response packet is returned from the base station. Next, a case where the base station undergoes power down for some reason will be described with reference to FIG. 5.

Figure 5:
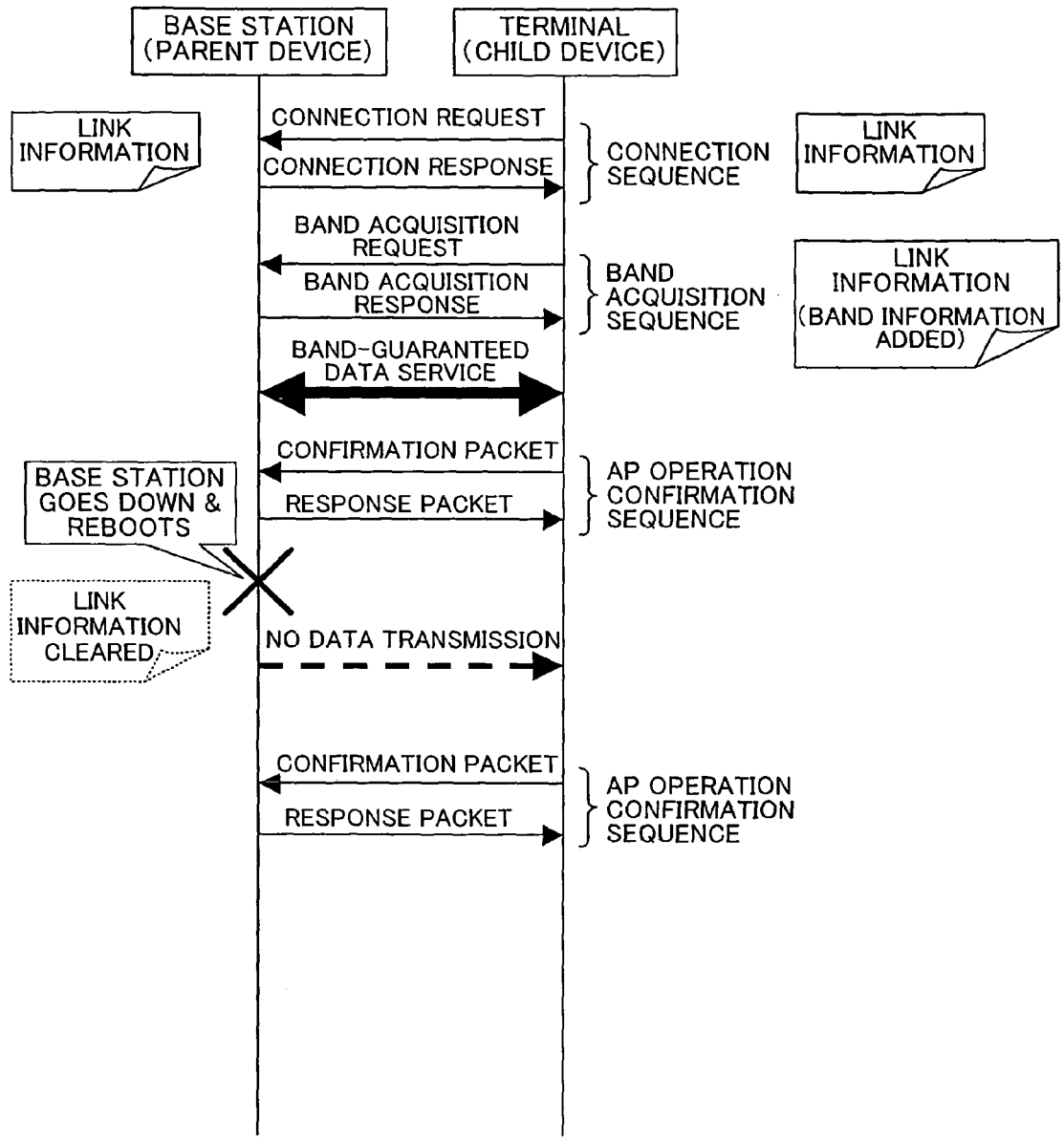
FIG. 5 shows a sequence where a terminal fails to transmit a confirmation packet while the base station is down according to the first embodiment of the present invention.

As shown in FIG. 5, first, after boot, the terminal performs the connection sequence and the band acquisition sequence to establish a wireless link with the base station. These sequences are the same as those described in FIG. 2(a). Similarly, these link information are recorded in each of the terminals and the base station.

After a wireless link is established by performing the sequence and the normal data service is started, the terminal transmits a confirmation packet to the base station in order to confirm the connection status with the base station, and checks the presence/absence of the response packet thereto (the AP operation confirmation sequence in the figure).

As shown in FIG. 5, if, after the response packet is returned from the base station, the base station undergoes power down for some reason and then reboots, the link information of the base station recorded when the connection was established is cleared.

Second Embodiment

A second embodiment of the present invention will now be described with reference to FIG. 6.

Figure 6B:
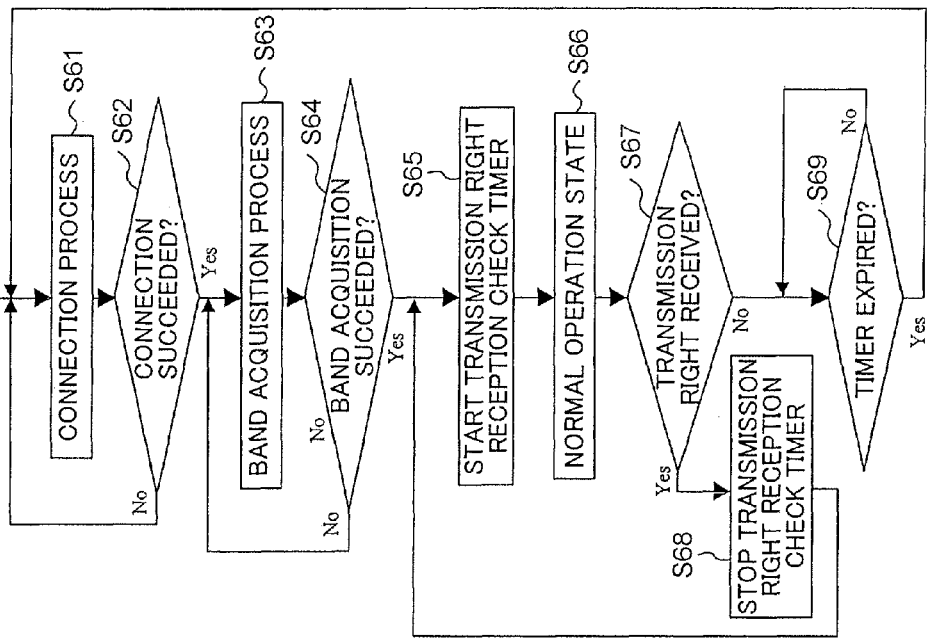
FIG. 6($a$) shows a sequence of base station confirmation using a transmission right reception check timer according to a second embodiment of the present invention, and FIG. 6($b$) shows a flow of base station confirmation using a transmission right reception check timer.
Figure 6A:
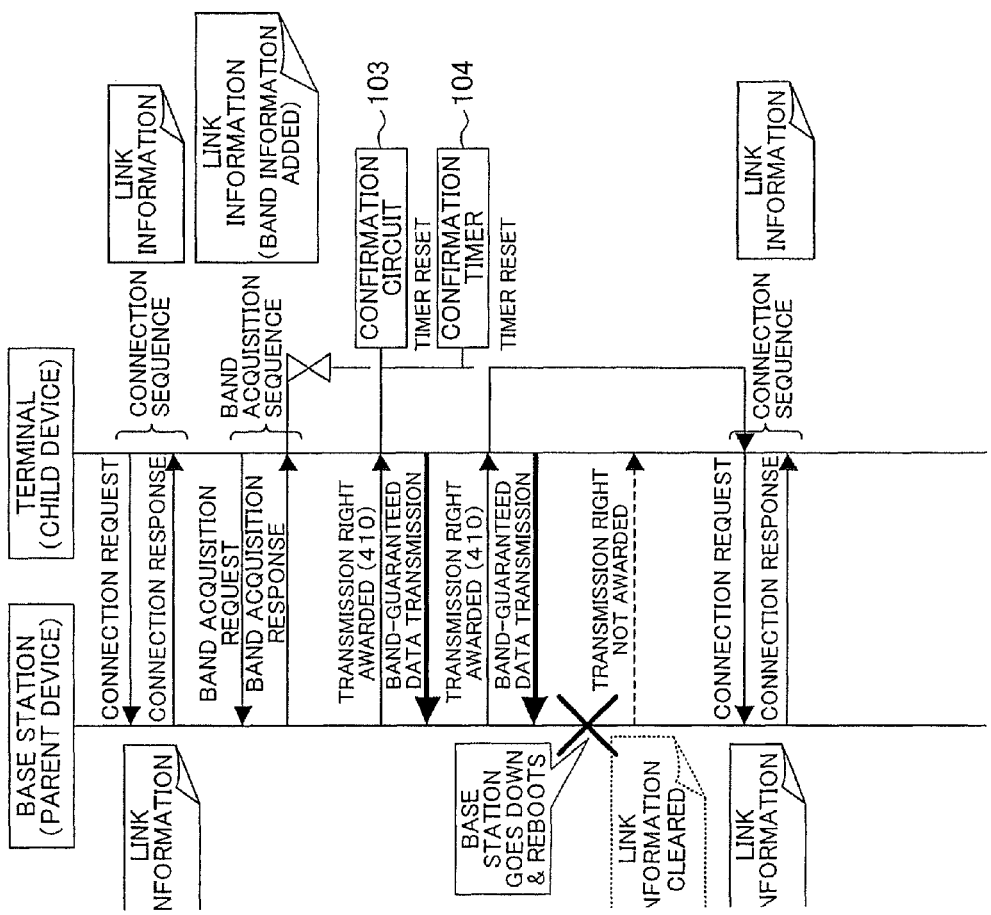

FIG. 6(a) is a communications sequence between the base station and the terminal showing a method for confirming the connection with the base station by checking the reception of the transmission right from the base station, where the terminal is the transmitter side.

First, after boot, the terminal 1 performs the connection sequence and the band acquisition sequence to establish a wireless link. After completion of each sequence, the base station and the terminal each record its link information as described above in the first embodiment.

In the present embodiment, a transmission right reception check timer (confirmation timer) 104 of a confirmation circuit 103 is started after receiving the signal transmitted from the base station in the band acquisition sequence, i.e., a band acquisition response signal being a signal of the IEEE 802.11e standard with no band guarantee limitation.

When a transmission right awarding signal (predetermined signal) 410 transmitted from the base station is received, the transmission right reception check timer 104 is reset to start over the measurement of the preset time. The confirmation circuit 103 determines that the wireless network connection between the base station and the terminal 1 is alive when the transmission right awarding signal 410 is received before the completion of the measurement of the preset time by the transmission right reception check timer 104.

When the transmission right reception check timer 104 completes the measurement of the preset time, the confirmation circuit 103 of the terminal 1 transmits the base station a connection request signal being a signal of the IEEE 802.11 standard to update the link information through the connection sequence.

Figure 7:
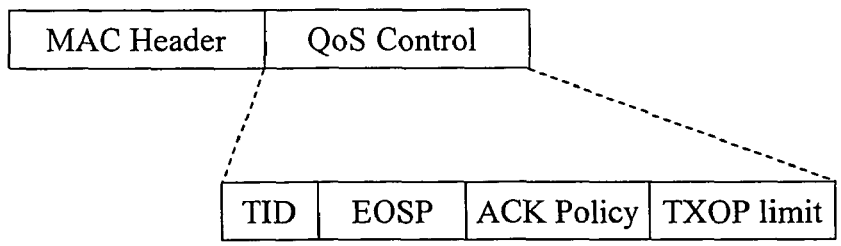
FIG. 7 shows a format of a transmission right awarding signal (QoS CF-Poll).

FIG. 7 shows the format of the transmission right awarding signal (QoS CF-Poll). The format of the packet shown herein is the format used by communications devices of the IEEE 802.11e standard, and corresponds to the transmission right awarding in the IEEE 802.11 MAC frame types shown in FIG. 4(c). The base station can specify the terminal to be awarded the transmission right and the band-guaranteed data thereof by Address1 (destination address) and TID (Traffic Identifier) of the transmission right awarding signal.

Next, FIG. 6(b) shows the operation flow of the terminal.

In FIG. 6(b), the operation flow of the connection sequence and the band acquisition sequence from steps S61 to S64 is the same as that described above in the first embodiment with reference to FIG. 2(b), and will not be further discussed below.

If the band acquisition response from the base station is received in the band acquisition sequence, i.e., if it is determined in step S64 that the band acquisition has succeeded, the terminal 1 starts the transmission right reception check timer 104 in step S65 for setting the period for checking the presence of the base station based on whether or not the transmission right has been received. Then, the process proceeds to step S66, i.e., the normal operation state.

Next, the terminal 1 determines in step S67 whether or not the transmission right has been received from the base station. If so, the terminal 1 confirms the presence of the base station and stops the transmission right reception check timer 104 in step S68. Then, the timer is started again in step S65. If it is determined in step S67 that the transmission right has not been received, the transmission right reception check timer 104 continues the measurement. If it is determined in step S69 that the timer 104 has expired, the process returns to step S61 to perform the connection sequence to re-establish the connection with the base station.

With such a configuration, if the transmission right is awarded 410 from the base station and it is possible to confirm that there is a normal connection with the base station, the transmission right reception check timer 104 is reset and started. Therefore, even if the base station undergoes power down for some reason and then reboots before the predetermined preset time expires, it is possible to perform the connection sequence again to thereby avoid the problem that the terminal continues to communicate with the base station without checking the temporary power down of the base station.

Third Embodiment

A third embodiment of the present invention will now be described with reference to FIG. 8.

FIG. 8(a) is a communications sequence between the base station and the terminal showing a method for confirming the presence of the base station by checking the reception status of the band-guaranteed data from the base station, where the terminal 1 is the receiver side establishing the band guarantee.

After boot, the flow of performing the connection sequence and the band acquisition sequence up until a wireless link with the base station is established is the same as those described above in the first and second embodiments with reference to FIGS. 2(a) and 6(a), and will not be further discussed below.

If the signal transmitted from the base station, i.e., a band acquisition response signal being a signal of the IEEE 802.11e standard with no band guarantee limitation, is received in the band acquisition sequence, the timer is started as in the second embodiment. However, the present embodiment differs from the second embodiment in that the timer is a band-guaranteed data reception check timer (confirmation timer) 104' that is reset upon receiving the band-guaranteed data (predetermined signal) from the base station and is restarted at the same time. Thus, in the present embodiment, a confirmation circuit 103' confirms that the wireless network connection between the terminal 1 and the base station is alive by receiving the band-guaranteed data from the base station.

Since it is possible to confirm that the wireless network connection with the base station is alive upon receiving the band-guaranteed data as described above, the band-guaranteed data reception check timer 104' is reset and restarted upon receiving the band-guaranteed data. If the band-guaranteed data is not received from the base station before the expiration of the predetermined preset time, the confirmation circuit 103' determines that the wireless network connection between the base station and the terminal 1 has been disconnected. Then, the connection request signal being a signal of the IEEE 802.11 standard is transmitted again to the base station, the connection sequence is performed, and the link information is updated.

Figure 9:
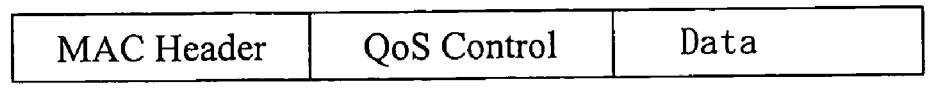
FIG. 9 shows a format of band-guaranteed data (QoS Data).

FIG. 9 shows the format of the band-guaranteed data (QoS Data). The format of the packet shown herein is the format used by communications devices of the IEEE 802.11e standard, and is classified as the band-guaranteed data in the IEEE 802.11 MAC frame types shown in FIG. 4(*c*).

Next, FIG. 8(*b*) shows the operation flow of the terminal.

In FIG. 8(*b*), the operation flow of the connection sequence and the band acquisition sequence from steps S81 to S84 is the same as that described above in the first embodiment with reference to FIG. 2(*b*), and will not be further discussed below.

If the band acquisition response is received, from the base station in the band acquisition sequence, i.e., if it is determined in step S84 that the band acquisition has succeeded, the terminal 1 starts the band-guaranteed data reception check timer 104' in step S85 for setting the period for checking the presence of the base station based on whether or not the band-guaranteed data has been received. Then, the process proceeds to step S86, i.e., the normal operation state.

Next, the terminal determines in step S87 whether or not the band-guaranteed data has been received from the base station. If so, the terminal confirms the presence of the base station and stops the band-guaranteed data reception check timer 104' in step S86. Then, the process returns to step S85, and the timer is restarted. If it is determined in step S87 that the band-guaranteed data has not been received, the band-guaranteed data reception check timer 104' continues the measurement. If it is determined in step S89 that the timer 104' has expired, the process returns to step S81 to perform the connection sequence to re-establish the connection with the base station.

With such a configuration, if the band-guaranteed data is transmitted from the base station and it is possible to confirm that there is a normal connection with the base station, the band-guaranteed data reception check timer 104' is reset and started. Therefore, even if the base station undergoes power down and then reboots before the predetermined preset time expires, it is possible to perform the connection sequence again to thereby avoid the problem that the terminal 1 continues to communicate with the base station without checking the temporary power down of base station.

Fourth Embodiment

A fourth embodiment of the present invention will now be described with reference to FIG. 10.

Figure 10B:
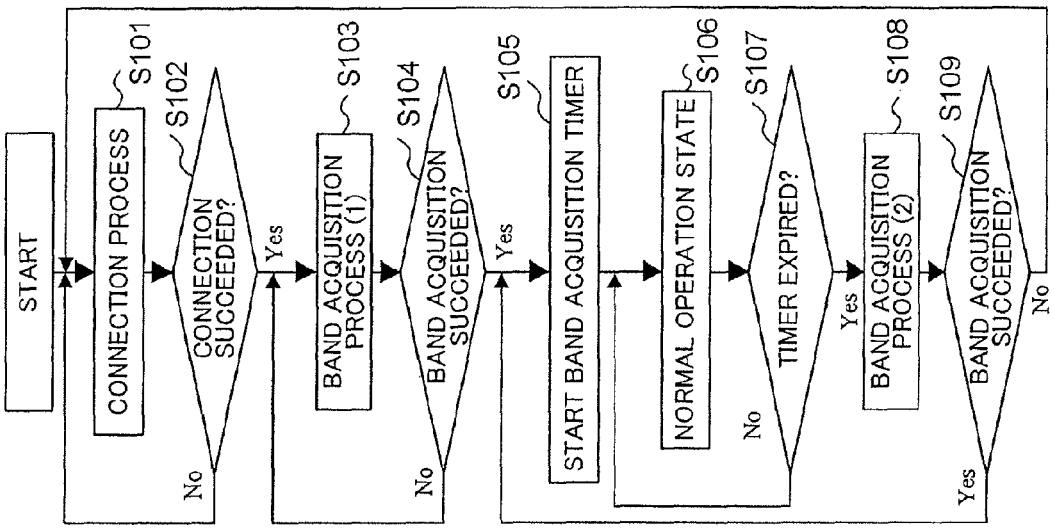
FIG. 10($a$) shows a sequence of base station confirmation using a periodic band acquisition timer according to a fourth embodiment of the present invention, and FIG. 10($b$) shows a flow of base station confirmation using a periodic band acquisition timer.

FIG. 10(*a*) is a communications sequence between the base station and the terminal showing a method in which the terminal confirms the presence of the base station by periodically establishing a band guarantee.

After boot, the flow of performing the connection sequence and the band acquisition sequence up until a wireless link with the base station is established is the same as those described above in the first and second embodiments with reference to FIGS. 2(*a*) and 6(*a*), and will not be further discussed below.

If the band acquisition response signal is received from the base station in the band acquisition sequence, the timer is started to start the measurement of a predetermined time.

Then, when the measurement of the predetermined time is completed after repeatedly receiving the band-guaranteed data from the base station, the band acquisition request signal (base station confirmation signal) is transmitted again from a signal output circuit 100' to the base station. If the base station receiving the band acquisition request signal transmits the band acquisition response signal (confirmation response signal) in response to the band acquisition request signal, and the signal is received by a confirmation circuit 101' of the terminal 1, the confirmation circuit 101' determines that the wireless network connection between the terminal 1 and the base station is alive. Moreover, the confirmation circuit 101' resets a band acquisition timer (confirmation timer) 102' thereof to start the measurement of the preset time and, when the measurement of the preset time is completed, transmits the band acquisition request signal (base station confirmation signal) again to the base station.

In the present embodiment, whether or not the wireless network connection between the terminal 1 and the base station is alive is determined by periodically performing the band acquisition sequence to establish a wireless link. The band acquisition request signal transmitted from the terminal 1 and the band acquisition response signal transmitted from the base station to the terminal 1 are signals of the IEEE 802.11e standard with no band guarantee limitation.

FIG. 11 shows the format of the band acquisition request signal (AddTs Request) and that of the band acquisition response signal (AddTs Response). The formats of the packets shown herein are the formats used by communications devices of the IEEE 802.11e standard, and are classified as Action in the IEEE 802.11 MAC frame types shown in FIG. 4(*c*). The terminal can specify, to the base station, a requested band by using the TSPEC field of the band acquisition request signal. The base station can notify the terminal of the acceptance/rejection of the request by means of the StatusCode field of the band acquisition response signal as a response to the band acquisition request signal.

With such a configuration, even if the base station undergoes power down for some reason and then reboots after the terminal 1 receives the band acquisition response signal from the base station and before the terminal 1 next transmits the band acquisition request signal, no band acquisition response is returned from the base station for subsequent band acquisition requests from the terminal 1, whereby it is possible to confirm that the wireless network connection between the base station and the terminal 1 is no longer alive. Thus, the terminal 1 can perform the connection sequence and the band acquisition sequence again to establish a wireless link.

Next, FIG. 10(*b*) shows the operation flow of the terminal 1.

In FIG. 10(*b*), the operation flow of the connection sequence and the band acquisition sequence from steps S101 to S104 is the same as that described above in the first embodiment with reference to FIG. 2(*b*), and will not be further discussed below.

If the band acquisition response is received from the base station in the band acquisition sequence, i.e., if it is determined in step S104 that the band acquisition has succeeded, the terminal 1 starts the band acquisition timer 102' in step S105 for measuring the time until the next band acquisition request signal is transmitted to the base station. After step S105, the process enters the normal operation state in step S106. Then, it is determined in step S107 whether or not the predetermined preset time of the band acquisition timer 102', which has been started in step S105, has expired. If so, the process proceeds to the next band acquisition process (2) in step S108. If the band acquisition succeeds through this process, the process returns to step S105 to start the band acquisition timer 102' for measuring the time until the next band acquisition request signal is transmitted. If it is determined in step S109 that the band acquisition has not succeeded, i.e., if there is no band acquisition response from the base station, the process returns to step S101 to perform the connection process again.

With such a configuration, it is possible to avoid the problem that the terminal 1 continues to communicate with the base station without checking the temporary power down of base station.

The present embodiment is based on the fact that if the base station is operating without power down, the band acquisition response is certainly transmitted from the base station as long as the terminal 1 repeatedly transmits the band acquisition request signal.

Figure 10A:
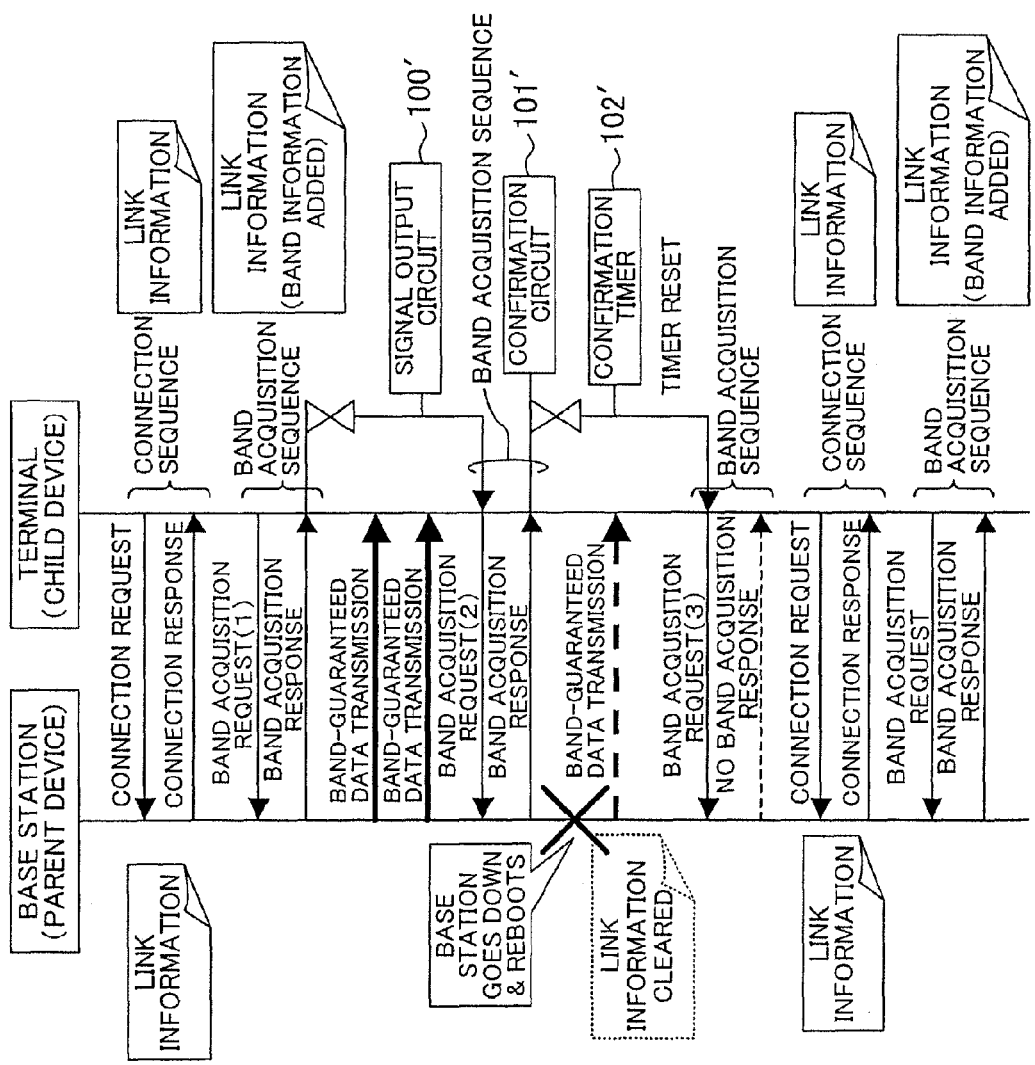

With the band acquisition request (1) and the band acquisition request (2) shown in FIG. 10(a), if the same content (parameter) is used, there is no influence on the band even if the band acquisition request is repeated.

Fifth Embodiment

A fifth embodiment of the present invention will now be described with reference to FIGS. 12 to 14.

Figure 12:
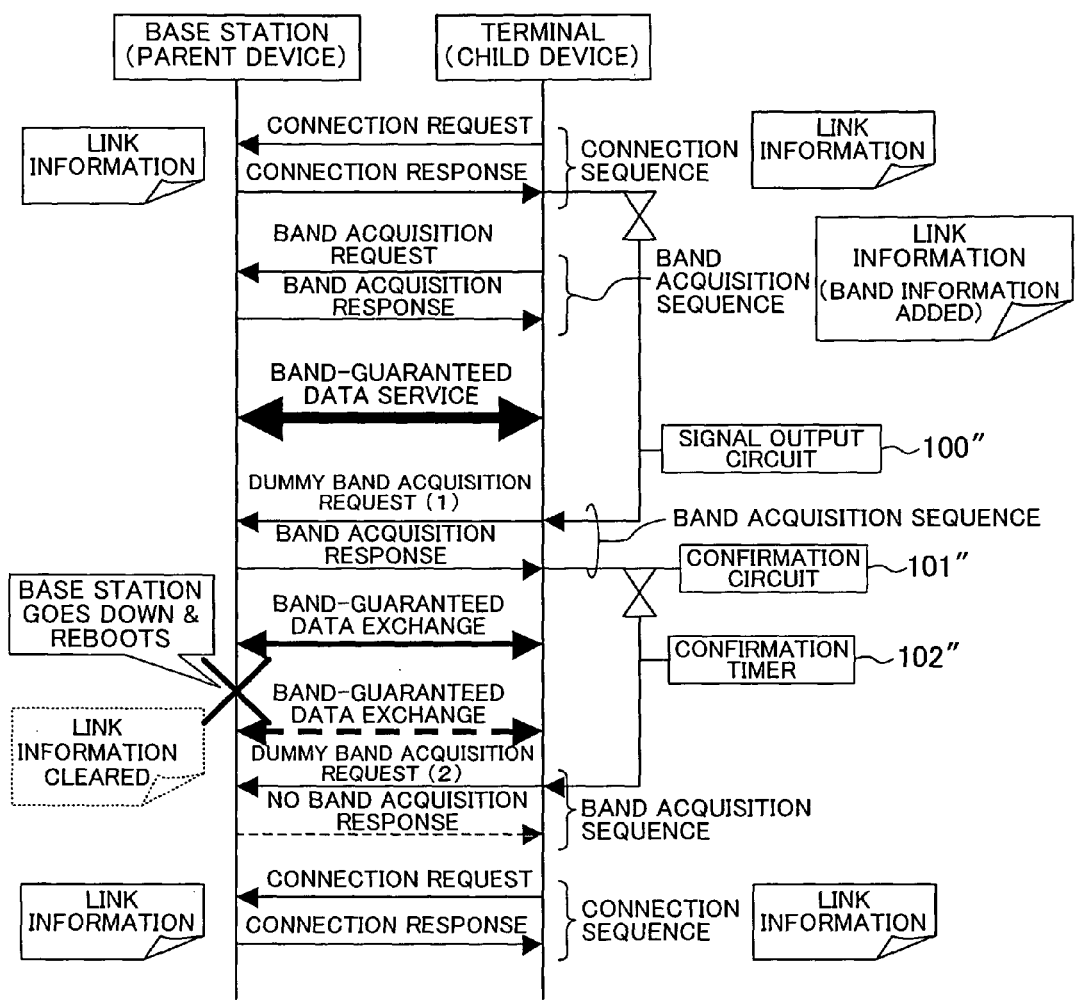
FIG. 12 shows a sequence of base station confirmation using a periodic dummy band acquisition timer according to a fifth embodiment of the present invention.

FIG. 12 shows a communications sequence between the base station and the terminal 1 for a method in which the presence of the base station is confirmed by the terminal 1 periodically establishing a minimum band guarantee after performing a communications process with an established band guarantee.

After boot, the flow of performing the connection sequence and the band acquisition sequence up until a wireless link with the base station is established is the same as those described above in the first and second embodiments with reference to FIGS. 2(a) and 6(a), and will not be further discussed below.

If the band acquisition response signal is received from the base station in the band acquisition sequence, the timer is started to start the measurement of a predetermined time. Then, when the measurement of the predetermined time is completed after repeatedly receiving the band-guaranteed data from the base station, a dummy band acquisition request signal (base station confirmation signal) for acquiring a minimum band guarantee is transmitted from a signal output circuit 100" to the base station. If the base station receiving the dummy band acquisition request signal transmits the band acquisition response signal (confirmation response signal) in response to the dummy band acquisition request signal, and the signal is received by a confirmation circuit 101" of the terminal 1, the confirmation circuit 101" determines that the wireless network connection between the terminal 1 and the base station is alive. Moreover, the confirmation circuit 101" resets a dummy band acquisition timer (confirmation timer) 102" thereof to start the measurement of the preset time and, when the measurement of the preset time is completed, transmits the dummy band acquisition request signal (base station confirmation signal) again to the base station.

In the present embodiment, whether or not the wireless network connection between the terminal 1 and the base station is alive is confirmed by periodically performing the dummy band acquisition sequence to establish a wireless link. The dummy band acquisition request signal transmitted from the terminal 1 and the band acquisition response signal transmitted from the base station to the terminal 1 are both signals of the IEEE 802.11e standard with no band guarantee limitation.

In the present embodiment, the time interval between the reception of the band acquisition response signal from the base station and the transmission of the next dummy band acquisition request signal from the terminal 1 is set by the dummy band acquisition timer (confirmation timer) 102", and a minimum band guarantee is periodically established with the base station. Therefore, if the base station (parent device) undergoes power down during the measurement of the dummy band acquisition timer 102" and then reboots, as shown in FIG. 12, there is made no band acquisition response from the base station in response to the dummy band acquisition request from the terminal upon expiration of the dummy band acquisition timer 102". Therefore, the terminal 1 can confirm that the connection with the base station has been disconnected, and can perform the connection sequence again. The dummy band acquisition request signal transmitted from the terminal 1 and the band acquisition response signal transmitted from the base station are signals of the IEEE 802.11e standard that are not restricted by the band guarantee and can thus be exchanged freely.

Figure 13:
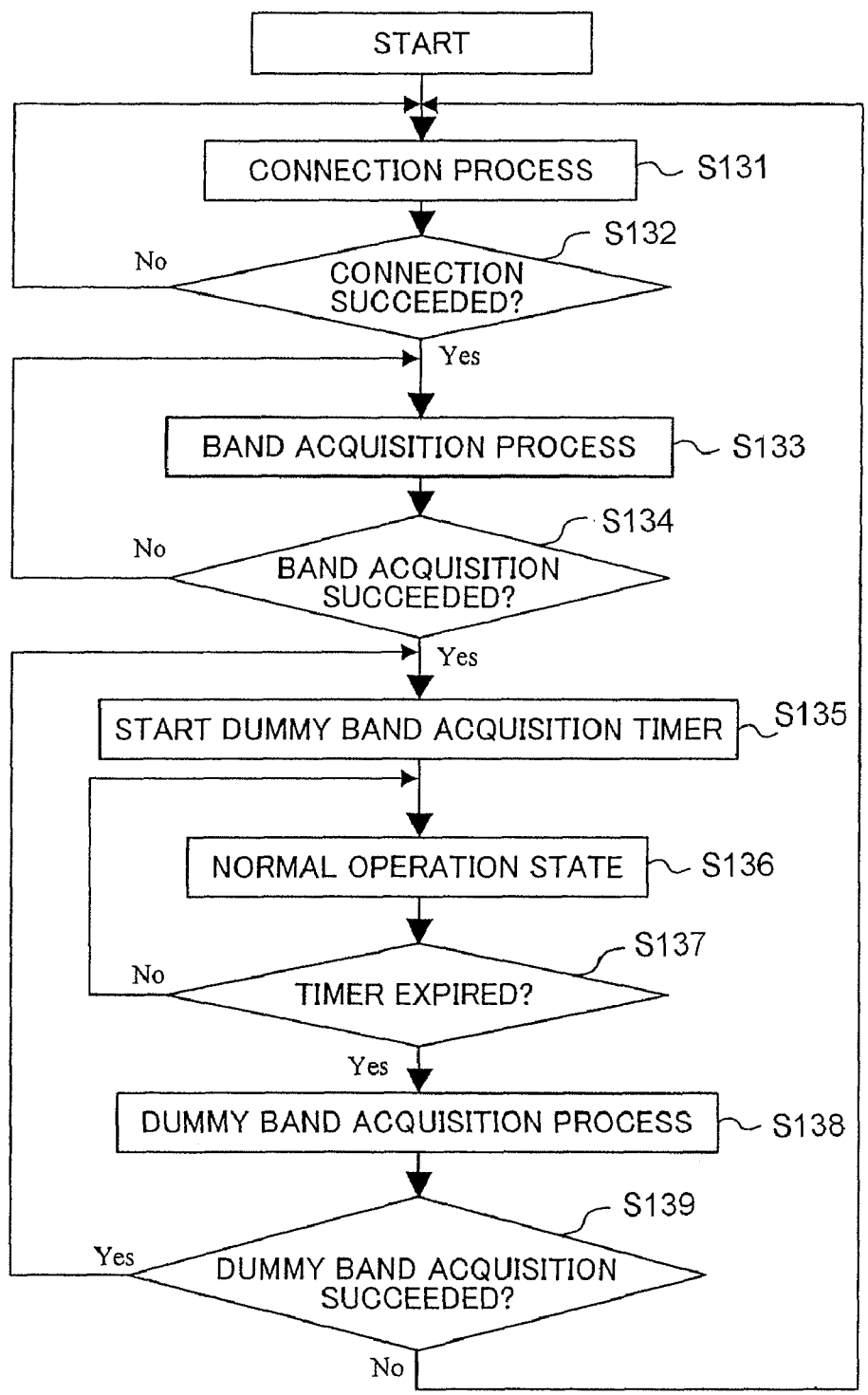
FIG. 13 shows a flow of base station confirmation using a periodic dummy band acquisition timer according to the fifth embodiment of the present invention.
Figure 14:
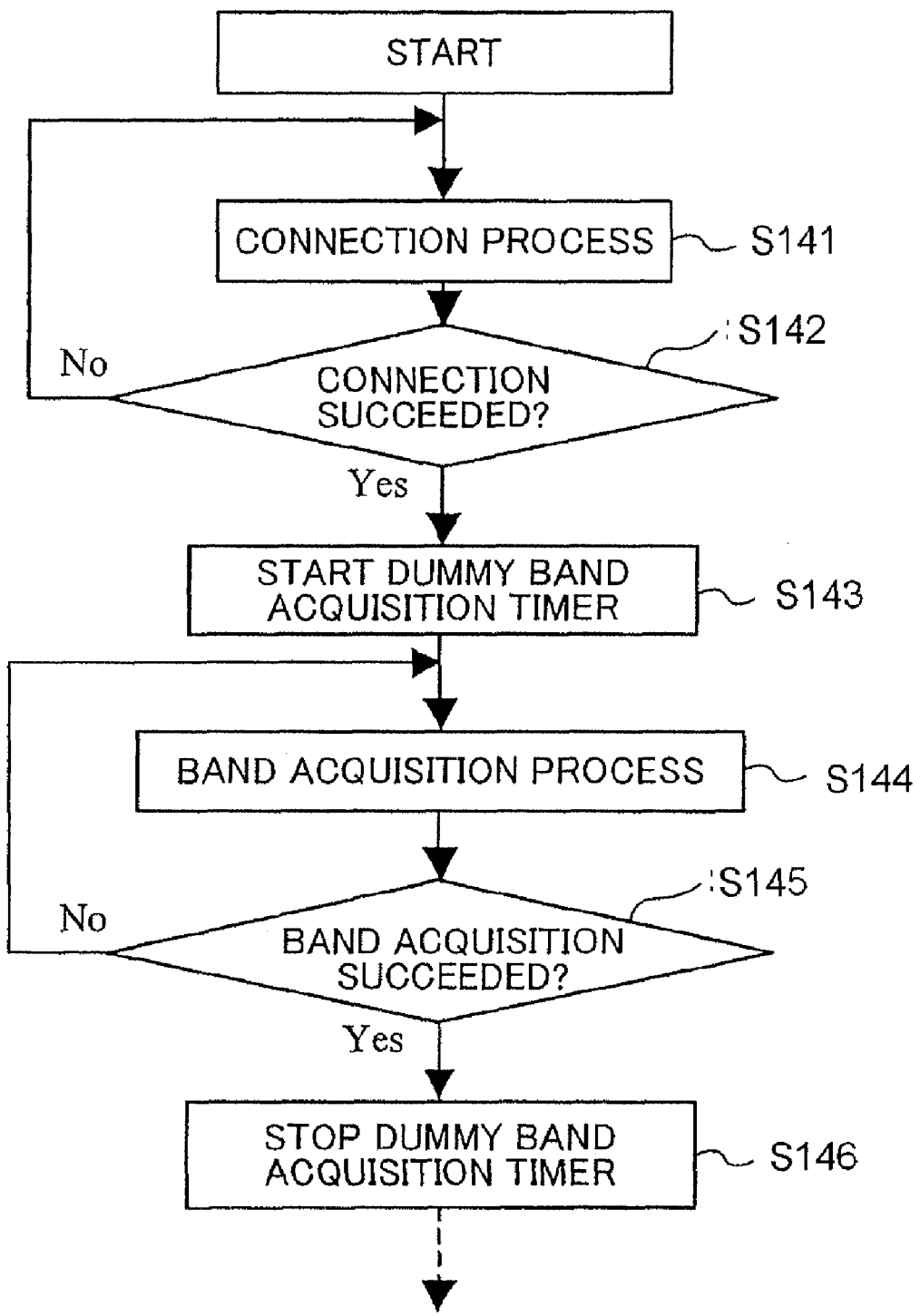
FIG. 14 shows a flow of base station confirmation using a periodic band acquisition timer and a dummy acquisition timer according to the fifth embodiment of the present invention.
Figure 16:
FIG. 16 shows a format of a disconnection packet.

Next, FIG. 13 shows the operation flow of the terminal.

In FIG. 13, the operation flow of the connection sequence and the band acquisition sequence from steps S131 to S134 is the same as that described above in the first embodiment with reference to FIG. 2(b), and will not be further discussed below.

If the band acquisition response is received from the base station in the band acquisition sequence, i.e., if it is determined in step S134 that the band acquisition has succeeded, the terminal 1 starts the dummy band acquisition timer 102" in step S135. After step S135, the process enters the normal operation state in step S136. Then, it is determined in step S137 whether or not the measurement of the predetermined preset time by the dummy band acquisition timer 102", which has been started in step S135, has expired. If so, a dummy band acquisition process is performed in step S138. If the dummy band acquisition succeeds through this process, the process returns to step S135 to start the dummy band acquisition timer 102" for measuring the time until the next dummy band acquisition request is transmitted. If it is determined in step S139 that the dummy band acquisition has not succeeded, i.e., if there is no band acquisition response from the base station, the process returns to step S131 to perform the connection process again.

With such a configuration, it is possible to avoid the problem that the terminal 1 continues to communicate with the base station without checking the temporary power down of base station.

As shown in FIG. 12, the presence of the wireless network connection between the base station and the terminal 1 is checked by periodically establishing a minimum band guarantee from the terminal 1 side. Therefore, with the provision of the dummy band acquisition timer 102", it is possible to confirm the presence of the wireless network connection between the base station and the terminal 1 at intervals of the preset tithe.

In the present embodiment, after the terminal 1 acquires a band guarantee, the dummy band acquisition request signal is repeatedly output to the base station. Alternatively, the present invention can employ a configuration such that the dummy band acquisition request signal is repeatedly output to the base station before acquiring a band guarantee. FIG. 14 shows the operation flow of the terminal 1 in such a case.

The operation flow of FIG. 14 will be described. After the connection sequence of steps S141 to S142 ends, the dummy band acquisition timer is started in step S143 so that the dummy band acquisition request signal is transmitted each time the preset time expires. Then, in steps S144 and S145, the band acquisition sequence is introduced, whereby the band acquisition sequence is performed during the measurement of the dummy band acquisition timer. If the base station operates without undergoing power down, the band acquisition succeeds as the band acquisition sequence is repeated and, in such a case, the wireless network connection with the base station is confirmed, whereby the dummy band acquisition timer may stop in step S146 or may continue. If the band acquisition does not succeed even by repeating the band acquisition sequence, it is determined that the wireless network connection with the base station has been disconnected. Then, upon expiration of the dummy band acquisition timer, which was started in step S143, the connection process is performed again (this step is not shown).

Sixth Embodiment

A sixth embodiment will now be described with reference to FIG. 15.

FIG. 15(a) shows a sequence where the base station transmits a disconnection packet when the base station (parent device) reboots.

After boot of the base station, the flow of performing the connection sequence and the band acquisition sequence to enter the normal operation state up until the base station undergoes power down for some reason and reboots is the same as that described above in the first embodiment with reference to FIG. 5(a), and will not be further discussed below.

The present embodiment differs from the first embodiment in that when the base station undergoes power down and then reboots, a disconnection packet output circuit (disconnection request signal output circuit) 105 of the base station transmits a disconnection packet (disconnection request signal) to all terminals so as to clear the link information 900 of the terminals.

FIG. 15 shows the format of the disconnection packet. The format of the disconnection packet shown herein is the format used by communications devices of the IEEE 802.11 standard.

All the terminals that receive the disconnection packet from the base station can perform the re-connection sequence, whereby it is possible to avoid the problem that the terminals continue to communicate with the base station without checking the temporary power down of base station.

FIG. 15(b) shows a flow of the base station (parent device), and FIG. 15(c) shows a flow of the terminal side.

In FIG. 15(b), when the base station boots, the base station first transmits the disconnection packet to all the terminals in the BBS (Basic Service Set), or a group of units centered about the base station, in step S151. It is shown that the process then enters the normal operation state in step S152.

FIG. 15(c) shows that after the terminal boots, the terminal performs the connection sequence of steps S161 and S162 and then further performs the band acquisition sequence of steps S163 and S164, thereafter entering the normal state in step S165. Then, in step S166, it is determined whether or not the disconnection packet has been received from the base station. If not, the normal state of step S165 is maintained. If the disconnection packet has been received, it is determined that the base station has undergone power down for some reason and rebooted as shown in FIG. 15(b), and the process returns to step S161 to perform the re-connection sequence.

INDUSTRIAL APPLICABILITY

As described above, the present invention is directed to a case where a wireless network is constructed with a wireless LAN device having a base station function compatible with the IEEE 802.11e standard, and a wireless LAN device having a terminal function compatible with the standard. Even if the wireless network connection is disconnected due to an unexpected cutoff of power supply to the wireless LAN device having a base station function after the band is guaranteed for data transfer between the wireless LAN devices, the wireless LAN device having a terminal function can accurately detect the disconnection of the wireless network connection, and the re-connection of the wireless network can be performed immediately. Therefore, the present invention is useful in the field of wireless network requiring a band control technique using streaming, etc.

The invention claimed is:

1. A wireless LAN device having a terminal function, for constructing a wireless network with one wireless LAN device having a base station function compatible with an IEEE 802.11e standard being a generic standard to an IEEE 802.11 standard and having a data transfer band guarantee function and at least one wireless LAN device having a terminal function compatible with the IEEE 802.11e standard, the wireless LAN device having a terminal function comprising:
   a signal output circuit for, after a band is guaranteed for data transfer between the wireless LAN device having a terminal function and the wireless LAN device having a base station function, outputting a base station confirmation signal to the wireless LAN device having a base station function by using a signal of the IEEE 802.11 standard or a signal of the IEEE 802.11e standard for which there is no band guarantee; and
   a confirmation circuit for, when the wireless LAN device having a base station function transmits a confirmation response signal in response to the base station confirmation signal output from the signal output circuit, receiving the confirmation response signal to confirm that the wireless LAN device having a terminal function is connected to the wireless LAN device having a base station function,
   wherein the signal output circuit includes a confirmation timer that starts measuring a preset time when a band acquisition response signal being a signal of the IEEE 802.11e standard is received from the wireless LAN device having a base station function and a band for data transfer is guaranteed, and a band acquisition request signal being a signal of the IEEE 802.11e standard is output to the wireless LAN device having a base station function as the base station confirmation signal after the preset time expires.

2. A wireless LAN device having a terminal function, for constructing a wireless network with one wireless LAN device having a base station function compatible with an IEEE 802.11e standard being a generic standard to an IEEE 802.11 standard and having a data transfer band guarantee function and at least one wireless LAN device having a terminal function compatible with the IEEE 802.11e standard, the wireless LAN device having a terminal function comprising:
   a signal output circuit for, after a band is guaranteed for data transfer between the wireless LAN device having a terminal function and the wireless LAN device having a base station function, outputting a base station confirmation signal to the wireless LAN device having a base station function by using a signal of the IEEE 802.11 standard or a signal of the IEEE 802.11e standard for which there is no band guarantee; and a confirmation circuit for, when the wireless LAN device having a base station function transmits a confirmation response signal in response to the base station confirmation signal output from the signal output circuit, receiving the confirmation response signal to confirm that the wireless LAN device having a terminal function is connected to the wireless LAN device having a base station function, wherein the signal output circuit includes a confirmation timer that starts measuring a preset time when a band acquisition response signal being a signal of the IEEE 802.11e standard is received from the wireless LAN device having a base station function and a band for data transfer is guaranteed, and a dummy band acquisition request signal being a signal of the IEEE 802.11e standard for which a data transfer bandwidth is narrow is output to the wireless LAN device having a base station function as the base station confirmation signal after the preset time expires.

3. The wireless LAN device having a terminal function of claim 1 or 2, wherein the signal output circuit outputs a connection request signal being a signal of the IEEE 802.11 standard to the wireless LAN device having a base station function when the band acquisition response signal is not received from the wireless LAN device having a base station function as the confirmation response signal.

* * * * *